J. W. GEORGE.
ROTARY INTERNAL COMBUSTION ENGINE.
APPLICATION FILED JAN. 26, 1920.

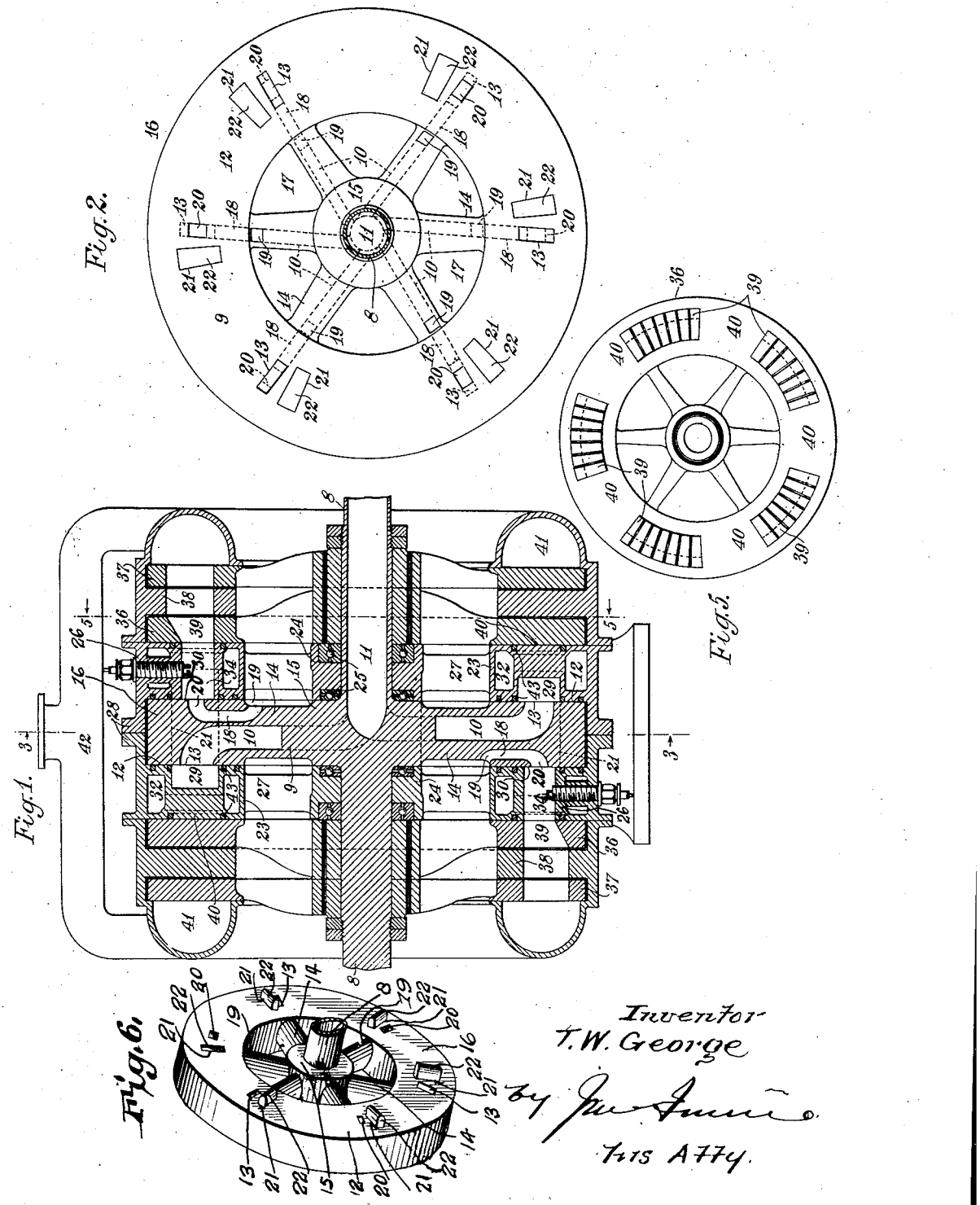

1,395,995.

Patented Nov. 1, 1921.
2 SHEETS—SHEET 2.

Inventor
J. W. George
by [signature]
his Atty.

UNITED STATES PATENT OFFICE.

JOHN WILLIAM GEORGE, OF STROUD GREEN, ENGLAND.

ROTARY INTERNAL-COMBUSTION ENGINE.

1,395,995.   Specification of Letters Patent.   Patented Nov. 1, 1921.

Application filed January 26, 1920. Serial No. 354,238.

*To all whom it may concern:*

Be it known that I, JOHN WILLIAM GEORGE, a subject of His Majesty the King of England, and resident of Stroud Green, in the county of Middlesex, Kingdom of England, have invented certain new and useful Improvements in or Connected with Rotary Internal-Combustion Engines, (for which I have filed application in Great Britain, application #21,187, dated December 18, 1918, Patent #139,841,) of which the following is a specification.

This invention relates to rotary internal combustion engines.

The invention has for its primary object to provide an improved rotary internal combustion engine which is highly efficient in construction and operation and of high power, and in which the movable parts are few in number, the parts liable to overheating are adequately cooled and insulated from the other parts of the engine, the explosive charges are highly compressed, the use of separate apparatus such as a pump coupled to the engine for compressing the charges may be avoided, the firing of the compressed charges takes place a large number of times in each revolution and at the correct moments to obtain the maximum power from the engine, the products of combustion are positively expelled from combustion chambers and from turbine wheels forming parts of the engine, said chambers and wheels are efficiently scavenged and cooled by a cooling fluid, and the use of valves, valve springs and cams, timing devices, and the like can be entirely dispensed with, thus providing an entirely automatic and foolproof engine.

Another object of the invention is to provide an improved double-acting rotary internal combustion engine in which centrifugal action and end thrust upon moving parts of the same are balanced.

The invention refers to rotary internal combustion engines having an outer casing, a rotor or inner drum mounted within said casing, the one being rotatable relatively to the other, induction and compression chambers, separate combustion chambers, and movable compression vanes the ends of which are operable within said compression chambers, and is chiefly distinguished in that the compression and combustion chambers are arranged at one or both ends of the rotor or drum instead of around and concentric with the periphery of the latter, and that the vanes move and operate laterally or transversely relatively to the rotor or drum and parallel to the axis of the shaft of the engine.

The invention will now be described with reference to the accompanying drawings, in which:—

Figure 1 is an axial sectional elevation of a suitable construction of double-acting engine embodying the invention.

Fig. 2 is an end elevation of the rotor or inner drum looking from the right hand side of Fig. 1.

Fig. 5 is a reduced end elevation of one of the turbine rings about the line 5—5 of Fig. 1.

Fig. 6 is a perspective view of the rotor.

Figure 4:
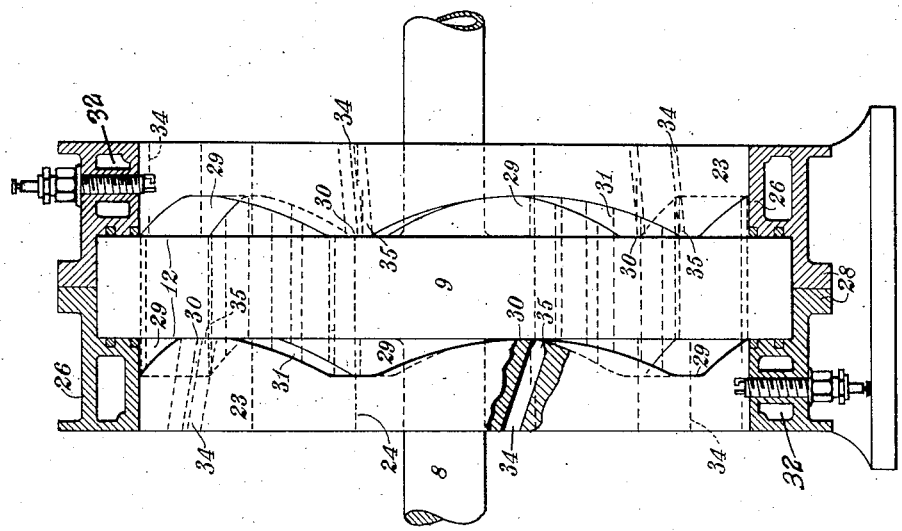
Fig. 4 is a partly axial sectional, and partly diagrammatic, elevation of the two outer-casing members and the rotor or inner drum, and showing portions of the multi-cam surfaces on said outer casing members.
Figure 3:
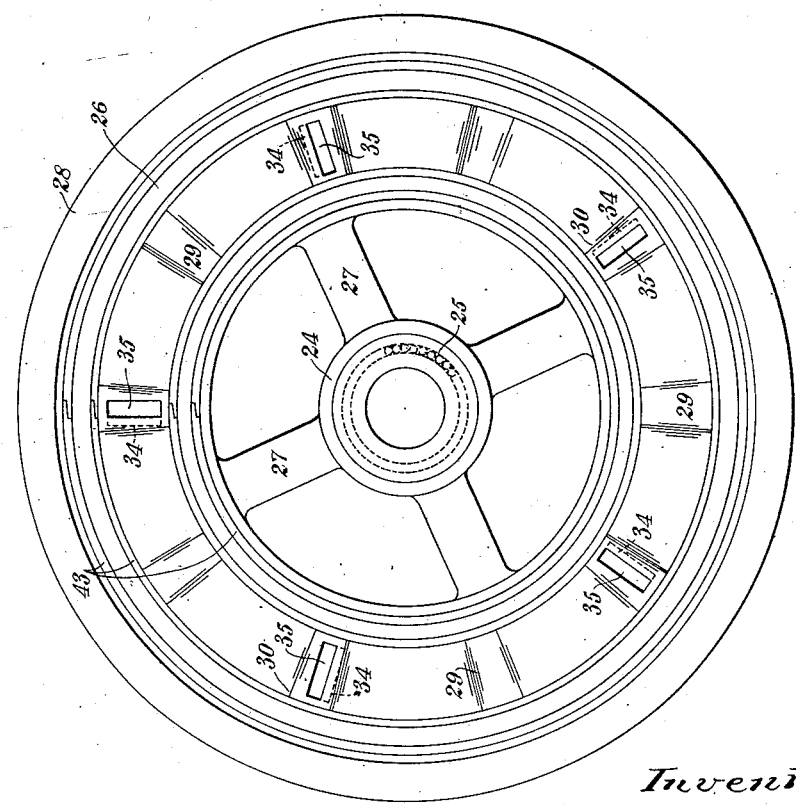
Fig. 3 is an end elevation of the engine about the line 3—3 of Fig. 1 and with the rotor or inner drum removed.

The double acting engine illustrated in the drawings comprises a partly hollow rotary shaft 8 upon which is concentrically formed or fitted to rotate therewith a disk-like or cylindrical rotor or inner drum 9 provided with a number, preferably six, of radial fuel inlet passages 10 which communicate with the hollowed portion 11 of said shaft and alternately with the opposite flat ends 12 of the rotor adjacent to the periphery of same at 13. The passages 10 are preferably formed within webs or conduits 14 which are positioned in the manner of the spokes of a wheel, so that the rotor 9 consists of a hub portion 15 integral with or otherwise secured upon the shaft 8, and a deep rim portion 16 containing the outer ends of the passages and connected to said hub portion by means of the webs or conduits. In this manner the open spaces 17 intervening between the hub portion 15, the rim portion 16 and the webs or conduits 14 provide means whereby the rotor can be internally cooled, and such cooling can be obtained by shaping the webs or conduits in the manner of fan blades and thus circulating air through the rotor by its rotation. The rotor is also provided with a number, say six, of radial scavenging-air inlet-ducts 18 which are also formed in the webs or conduits 14, the inner ends of said ducts terminating in apertures 19 formed in said webs or conducts and thus communicating with the air surrounding the latter, while their outer ends terminate in apertures 20 formed in the ends 12 of the rim portion 16 of the rotor, each of the last-mentioned apertures being in the end of the rotor opposed to that containing the outlet aperture 13 of the adjacent fuel inlet passage 10. Six lateral or transverse slots 21 are formed through the rim portion 16 of the rotor and terminate in the opposite ends 12 of the latter, and each slot is disposed adjacent to, and on one side of, each corresponding pair of the outlet apertures 13 and 20 of the fuel and scavenging air inlet ducts 10 and 18. Each slot 21 contains a plate-like vane 22 adapted to slide with a close fit laterally or transversely backward and forward through the rotor, that is, in a direction parallel to the axis of the latter and the shaft.

The rotor or inner drum 9 is mounted to rotate between two outer-casing members 23 which are preferably formed similarly to the rotor, that is, with hub portions 24 within which the shaft 8 is rotatably mounted through radial and thrust anti-friction bearings 25, and rim portions 26 coinciding with and disposed at the opposite ends of the rim portion 16 of the rotor and connected to said hub portions by means of spaced webs or spokes 27. The rim portions 26 of the casing members 23 are formed with annular flanges 28 which extend over and meet around the periphery of the rotor to completely inclose the latter, so that by this arrangement of making the outer casing in two separate parts the rotor and casing can be easily assembled. The ends 12 of the rim portion 16 of the rotor are flat as already mentioned, but the adjacent ends of the rim portions 26 of the casing member 23 are shaped to form, in conjunction with said ends of the rim portion of the rotor, a number of annularly arranged induction and compression chambers 29 and intervening abutments 30 at each end of the rotor, which abutments are in smooth running but fluid-tight contact with said rotor. Each chamber 29 is bounded by an outer surface 31 which first curves or slopes away from the adjacent end 12 of the rotor, annularly relatively to the casing member 23 in which it is formed, and in a direction parallel to the axis of the rotor and casing members, and similarly curves or slopes back toward said end of the rotor, see Fig. 4. The two sets of chambers 29 and abutments 30 are so arranged that each abutment at one end of the rotor is in alinement with the widest portions or center of a chamber at the other end of the rotor, see Fig. 4. In this manner two similar and opposed multi-cam surfaces are provided, and as the vanes 22 carried by the rotor are of such length that their ends continuously contact with said surfaces, each of said vanes is caused to slide alternately backward and forward through the rotor in a direction parallel to the axis of the latter. The rim portions 26 of the casing-members 23 are preferablly suitably hollowed as at 32 to enable them to be internally cooled by water, air or other cooling fluid. Each casing-member 23 is formed with a number of combustion or explosion chambers 34 which extend through the abutments 30 on the members from points near to the adjacent end 12 of the rotor to the outer end of said member and are disposed diagonally, or at an angle other than a right angle, to the plane of said outer end. Each combustion chamber 34 is fitted with one or more spark plugs or other ignition devices, and communicates with one of the compression chambers 29 by means of a transfer passage or port 35 extending to the inner surface of the corresponding abutment 30. In this manner a set of combustion chambers is disposed at each end of the rotor.

The outer ends of the combustion chambers 34 open out on to two turbine wheels mounted one at each end of the rotor 9 outside the corresponding casing-member 23 and secured upon the shaft 8 to rotate with the same and the rotor, each of said wheels consisting of one or a number of separate rings or disks having curved and/or angularly disposed radial or other blades or pockets fitted or formed on its or their periphery or peripheries. When a plurality of rotary turbine rings or disks are provided at each end of the engine they preferably alternate with interposed stationary rings or disks fitted or formed with similar but oppositely directed fluid-directing blades or pockets in known or convenient manner. In Fig. 1 two rotary turbine rings 36 and 37 and one stationary turbine ring 38 are shown at each end of the rotor. The blades or pockets of the turbine wheel, or of the first rotary ring or disk 36 thereof at each end of the engine, are preferably arranged in a plurality of sets 39 with flat plain or blank spaces 40 intervening between them on the inner end of said wheel or ring. The turbine wheels discharge into annular or other suitably shaped exhaust chambers 41 leading to a manifold 42.

The meeting surfaces or ends of the rotor 9 and the casing-members 23, and of said members and the turbine wheels or first turbine rings 36, are packed and rendered gas tight by means of tightening rings or bars 43 fitted between them, and said faces may be lubricated by suitable means. The ends, edges and sides of the vanes 22 may be packed by tightening strips or bars in known or convenient manner. The shaft is preferably insulated to prevent its over-heating.

The operations at each end of the engine, that is, at each end of the rotor 9, above described are as follows:—

As the rotor 9 revolves, and the ends of the vanes 22 carried thereby travel in the set of compression chambers 29 disposed at the particular end of the rotor being considered, each of three alternate vanes sucks behind it an explosive charge through the hollowed portion 11 of the shaft 8 and the adjacent fuel inlet passage 10 into the compression chamber 29 through which it happens to be moving, and this charge drawn in is compressed within said chamber by and in front of the next following vane, one of the other three, when it travels through the chamber, and the compressed charge is forced by this second vane out of said chamber into the combustion chamber 34 communicating with it through the respective transfer passage 35. The compressed charge is then fired in the combustion chamber 34 and the gases of combustion act upon one of the sets of blades 39 of the corresponding turbine wheel, the firing being timed by suitable means to take place preferably at the moment when the first blade of the set has just arrived opposite the said chamber. During the compression and transfer stages the plain or blank spaces 40 of the turbine wheel travel in front of the combustion chambers 34. The combustion gases, after acting upon the turbine wheel to rotate the same at high speed, escape through the exhaust chamber 41 at the end of the engine.

At the same time, each of the three other alternate vanes 22 sucks behind it a charge of air through the adjacent air inlet duct 18 into the compression chamber 29 through which it happens to be moving, and this air is compressed within said chamber by and in front of the next following vane, one of the first three, when it travels through the chamber, and the compressed air is forced by this second vane out of said chamber into the combustion chamber 34 communicating with it through the adjacent transfer passage 35 and scavenges the latter and the chamber, thus positively expelling all of the hot gases from said combustion chamber and cooling it in readiness to receive the next explosive charge. This scavenging air also passes through the set of turbine blades 39 which happen to be passing the combustion chamber 34, thus scavenging said blade set also and escapes by the exhaust chamber 41.

Thus, during the operation of the engine, the ends of the alternate vanes 22 at each end of the engine suck in explosive charges and compress charges of scavenging and cooling air, and draw in air and compress explosive charges, and the exploded charges act on sets of blades at intervals. As the above described operations take place at each end of the engine the latter is rendered double acting, but, as will be appreciated, while one end of each vane draws in air and compresses explosive charges, as the case may be, at one end of the engine, the other end of said vane at the other end of the engine operates to compress explosive charges and draw in air, or to compress air and draw in explosive charges, respectively. The provision of the two turbine wheels at both ends of the engine, and both acted upon at the same time by the combustion gases, insures the balancing of the engine and obviates end thrust upon the shaft 8.

What I claim is:—

1. A rotary internal combustion engine comprising an outer casing, a drum mounted for rotation within the casing, induction and compression chambers formed in the casing at the ends of the drum, combustion chambers communicating with said induction and compression chambers, and vanes movable in the drum and operable by the wall of the compression and induction chambers, said vanes moving parallel to the axis of the drum.

2. A rotary internal combustion engine comprising an outer casing, a drum mounted for rotation within the casing, chambers formed in the casing at the respective ends of the drum by multi-cam surfaces, combustion chambers in the casing, and vanes having axial movement through the drum in contact with the multi-cam surfaces of the chambers.

3. A rotary internal combustion engine comprising a casing, a drum mounted for rotation within the casing, the casing being formed at the ends of the drum with multi-cam surfaces to provide induction and compression chambers and intervening abutments, the abutments at one end of the drum being opposite the maximum depth of chamber at the opposite end of the drum, and vanes movable axially of the drum and carried thereby, said vanes being operated by the multi-cam surfaces forming the chambers.

4. A rotary internal combustion engine comprising a casing, a drum mounted for rotation within the casing, the surfaces of the casing at the ends of the drum being formed with chambers divided by abutments, the walls of the chambers remote from the drum presenting cam surfaces, and vanes carried by and movable axially of the drum through such cam surfaces, said vanes acting as compression elements in their passage through the chambers.

5. An internal combustion engine comprising a casing, a drum arranged within the same, said drum and casing being mounted for relative rotary movement, induction and compression chambers formed in the casing at the ends of the drum, compression vanes operative through said chambers, said vanes being carried by and movable axially of the drum, and combustion chambers formed in the casing and leading from said induction and compression chambers.

6. A rotary internal combustion engine comprising a casing, a drum within the casing, said drum and casing being mounted for relative rotary movement, compression chambers formed in the casing at the respective ends of the drum, compression vanes carried by the drum and movable axially thereof, said vanes being operated by the walls of the chambers and movable through the chambers for compression and induction purposes, a combustion chamber leading from and communicating with the compression chambers, and a turbine wheel operative from said combustion chamber.

7. A rotary internal combustion engine comprising a casing, a drum within the casing, said drum and casing being mounted for relative rotary movement, compression chambers formed in the casing at the respective ends of the drum, compression vanes carried by the drum and movable axially thereof, said vanes being operated by the walls of the chambers and movable through the chambers for compression and induction purposes, a combustion chamber leading from and communicating with the compression chambers, and a turbine wheel at each end of the casing having blades to be influenced by the pressure from the combustion chambers.

In testimony whereof I have hereunto signed my name.

JOHN WILLIAM GEORGE.